Patented Aug. 14, 1945

2,382,242

UNITED STATES PATENT OFFICE 2,382,242

FOOD COMPOSITION

Carl W. Lindow and Joseph J. Thompson, Battle Creek, Mich., assignors to Kellogg Company, Battle Creek, Mich., a corporation of Delaware No Drawing. Application July 8, 1943, Serial No. 493,838

22 Claims. (Cl. 99—163)

This invention relates to the protection and stabilization of food products and compositions, including vitamin containing or enriched food compositions, against decomposition, and particularly from oxidative deterioration.

In accordance with the present invention we have found that such foods may be stabilized by means of a relatively small proportion of hops, either in powdered form, or in the form of a water and alcohol soluble extract, with the result that food products or compositions which are subject to oxidative deterioration, and particularly vitamin enriched foods, may be stored in a simple manner, or exposed to the atmosphere for relatively long periods of time without appreciable oxidative deterioration, or loss of vitamin potency.

In one specific embodiment our invention relates to the combination of vitamins with a nutritious carrier, and the incorporation therewith of hops as a factorial stabilizer for the vitamins, to provide a product of excellent taste appeal and a keeping quality which permits it to be exposed to the atmosphere for relatively long periods of time without appreciable harmful effect.

In another specific embodiment our invention relates to the stabilization of fats and oils, and food compositions containing them, by means of approximately 1% or less of hops, against oxidative deterioration. Such foods may be composed of or contain butter, butterfat or the like dairy foods or compositions, or animal or vegetable glyceride fats and oil, such as lard, corn oil, and the like.

In ordinary practice, for the purpose of supplying a full or partial complement of a day's requirement of vitamins, it is necessary to resort to closed containers, capsules, tablets, pellets or chocolate coatings to prevent destruction of certain of the integral components of the vitamin product, since many of the vitamins are subject to destruction by mere exposure to ordinary atmospheric conditions. This usually results in products having undesirable taste characteristics and very inferior keeping qualities.

As an example of our invention we have provided a vitamin containing or enriched food composition having excellent taste appeal together with keeping qualities and of a consistency which enables it to be spread, similar to butter or peanut butter, and used with wafers, toast, crackers, cookies, bread and any other products with which it is compatible, for the purpose of enhancing both the taste and nutritional value of the aforesaid products.

Such vitamin composition or spread may be prepared so as to contain a complete complement of a day's requirement of these nutritional factors compounded in a manner whereby there is provided stability of the vitamins concomitant with taste appeal. A complete complement of the day's requirements of vitamins is based upon the standards prescribed by the Federal Security Administrator and upon those accepted by eminent nutrition authorities, to-wit:

| | |
|---|---|
| Vitamin A | 4,000 I.U. |
| Vitamin C | 30 milligrams or 600 I.U. |
| Vitamin D | 400 I.U. |
| Vitamin E | 10 milligrams |
| Vitamin K | 1 milligram |
| Vitamin $B_1$ | 1 milligram or 333 I.U. |
| Vitamin G | 2 milligrams |
| Pyridoxin | 0.8 milligram |
| Calcium pantothenate | 2.0 milligrams |
| Niacinamide | 10.0 milligrams |
| Inositol | 2.0 milligrams |
| Para amino benzoic acid | 2.0 milligrams |

In forming our vitamin spread we first prepare a carrier by dispersing about two parts of minutely divided sucrose or other sugar in about one part of an oleic medium such as a high melting point hydrogenated cocoanut oil or cottonseed oil.

The sugar may be refined, although we preferably employ a sugar specially prepared by subjecting a disaccharide to slight pyrolysis, such as at a temperature of from about 250° F. to about 400° F. for about one to about five minutes. The so prepared sugar has some antioxygenic effect which becomes enhanced in synergistic association with the further added hops. However, when using oils which are completely hydrogenated and free of the type of chemical bonds subject to labile changes they are not subject to auto-oxidation leading to the development of rancidity in the oil. It will also be understood that we may vary the proportions of sugar to oleic medium to suit taste and consistency.

We thereafter colloidally disperse in the aforesaid oleic-sugar medium, weighed quantities of purified vitamin concentrates and/or the pure vitamins themselves. After complete dispersion of the vitamins, a relatively small proportion of hops is incorporated as a factorial stabilizer, in a proportion of from 1 part per 10,000 to one part per 100,000 of the vitamin spread composition.

We may use the hops in finely divided form, or in the form of a concentrated water and alcohol soluble extract. We prefer to use hops of the species *Humulus americanus* and *Humulus lupulus*, either alone or in admixture, and we have found that an extract of a mixture of the two species to be highly effective.

A composition formed in accordance with the foregoing wherein the vitamin content was stabilized by means of hops and embodied as a spread or filler between cookies and packaged in a conventional paper packing retained its full vitamin potency for a long period of time. In the same manner a vitamin spread packed in a glass container, which was repeatedly opened and exposed to the atmosphere remained fully effective over a long period without noticeable loss of its predetermined vitamin potency. We may also prepare our vitamin spread in pats or provide it in requisite amount between cookies to provide a demarced quantity which will, for example, supply a full day's requirements of the vitamins. In addition to the palatability of the oleic-sugar base, the addition of the hops or extract provides a tasty product.

As an example of the value of hops as a stabilizer against oxidative deterioration of a food product such as a glyceride oil, peroxide determinations were made on several samples of corn oil. These tests were carried out on the fresh oil and after aeration thereof, with and without various antioxidants.

The aeration procedure was a modification of the Swift Stability Test, and consisted of passing washed and dried air at a measured rate of 1.2 cubic feet per hour, through a 100 gram sample of the oil for four hours, maintaining the temperature at 98° C. (steam bath). The peroxide values were determined by the Wheeler method.

The following is a tabulation of the various peroxide values given in millimoles per kilogram of oil. In each case the values presented are averages of two or more determinations.

Corn oil:
    Fresh _____ 0.48
    After aeration _____ 18.13
    Plus 0.1% pulverized hops after aeration _____ 12.28
    Plus 0.1% Avenex (a cereal grain antioxidant) after aeration _____ 15.50

From the foregoing the value, and particularly the enhanced value of hops as a stabilizer against oxidative deterioration of foods or food compositions will be apparent. It will also be apparent that we may employ the hops either in a finely divided powdered form or in the form of a water and alcohol soluble extract and in the relatively small proportion of about 1% or even much less. Likewise the hops may be utilized as a factorial stabilizer for the vitamin content of vitamin containing or enriched foods or concentrated vitamin preparations, or for the stabilization of foods in general which are subject to oxidative deteriorations such as animal and vegetable fats and oils or products containing them.

We claim as our invention:

1. The method of stabilizing a glyceride oil containing food composition against oxidative deterioration which comprises incorporating therewith a relatively small proportion of an agent selected from the group consisting of hops and a water and alcohol soluble extract of hops.

2. The method of stabilizing a glyceride oil containing food composition against oxidative deterioration which comprises incorporating therewith a relatively small proportion of hops in finely divided form.

3. The method of stabilizing a glyceride oil containing food composition against oxidative deterioration which comprises incorporating therewith a relatively small proportion of a water and alcohol soluble extract of hops.

4. The method of stabilizing a glyceride oil containing food composition against oxidative deterioration which comprises incorporating therewith a relatively small proportion of hops of the species *Humulus americanus*.

5. The method of stabilizing a glyceride oil containing food composition against oxidative deterioration which comprises incorporating therewith a relatively small proportion of hops of the species *Humulus lupulus*.

6. The method of stabilizing a glyceride oil containing food composition against oxidative deterioration which comprises incorporating therewith a relatively small proportion of a mixture of hops of the species *Humulus americanus* and *Humulus lupulus*.

7. The method of stabilizing a glyceride oil and vitamin containing food composition against oxidative deterioration which comprises incorporating therewith a relatively small proportion of an agent selected from the group consisting of hops and a water and alcohol soluble extract of hops.

8. The method of stabilizing vitamins in a glyceride oil containing food composition against oxidative deterioration which comprises incorporating therewith a relatively small proportion of hops.

9. The method of stabilizing glyceride oil containing food compositions against oxidative deterioration which comprises incorporating therewith a relatively small proportion of hops.

10. The method of stabilizing a glyceride oil against oxidative deterioration which comprises incorporating therewith a relatively small proportion of an agent selected from the group consisting of hops and a water and alcohol soluble extract of hops.

11. The method of stabilizing glyceride oil containing dairy compositions against oxidative deterioration which comprises incorporating therewith a relatively small proportion of an agent selected from the group consisting of hops and a water and alcohol soluble extract of hops.

12. A glyceride oil containing food composition stabilized against oxidative deterioration, said composition containing a small amount of an agent selected from the group consisting of hops and a water and alcohol soluble extract of hops as the stabilizing agent.

13. A glyceride oil containing food composition stabilized against oxidative deterioration, said composition containing a small amount of finely divided hops as the stabilizing agent.

14. A glyceride oil containing food composition stabilized against oxidative deterioration, said composition containing a small amount of water and alcohol soluble extract of hops as the stabilizing agent.

15. A glyceride oil and vitamin containing food composition stabilized against oxidative deterioration containing a small amount of an agent selected from the group consisting of hops and a water and alcohol soluble extract of hops as the stabilizing agent.

16. A glyceride oil containing food composition stabilized against oxidative deterioration containing a small amount of hops as the stabilizing agent.

17. A fat containing food composition stabilized against oxidative deterioration containing a small amount of an agent selected from the group consisting of hops and a water and alcohol soluble extract of hops as the stabilizing agent.

18. A glyceride oil containing food composition containing added vitamins and an agent selected from the group consisting of hops and a water and alcohol soluble extract of hops as a factorial stabilizer of the vitamin content.

19. A glyceride oil containing relatively solid spreadable food composition containing added vitamins and hops as a stabilizer against decomposition and oxidative deterioration of the vitamins.

20. A relatively solid spreadable food composition composed of an intimate admixture of a high melting point hydrogenated glyceride oil medium and a sugar as a base and having dispersed therein added vitamins and an agent selected from the group consisting of hops and a water and alcohol soluble extract of hops as a factorial stabilizer for the vitamins.

21. A relatively solid spreadable food composition composed of an intimate admixture of a high melting point hydrogenated glyceride oil medium and an anti-oxygenic sugar as a base and having dispersed therein added vitamins and hops as a factorial stabilizer for the vitamins.

22. A relatively solid spreadable food composition composed of an intimate admixture of a highly hydrogenated glyceride oil and a disaccharide as a base, a balanced complement of vitamins colloidally dispersed in said base, and a relatively small proportion of a concentrated water and alcohol soluble extract of hops in intimate admixture therewith as a stabilizer against decomposition and oxidative deterioration of said vitamins.

CARL W. LINDOW.
JOSEPH J. THOMPSON.